United States Patent [19]

Blanpied

[11] 4,400,477

[45] Aug. 23, 1983

[54] COPOLYESTER POLYOL RESINS, FOAMABLE BLENDS COMPRISING THE SAME, AND RESULTANT POLYISOCYANURATE FOAMS

[76] Inventor: Robert H. Blanpied, 10122 Cherry Tree Dr., Dallas, Tex. 75243

[21] Appl. No.: 349,607

[22] Filed: Feb. 17, 1982

[51] Int. Cl.$^3$ .............................................. C08G 18/14
[52] U.S. Cl. ............................... 521/112; 252/429 R; 521/118; 521/125; 521/128; 521/172; 528/220; 528/296; 528/302
[58] Field of Search .................. 528/220, 296, 302; 252/429 R; 521/112, 118, 125, 128, 172

[56] References Cited

U.S. PATENT DOCUMENTS

| | | | |
|---|---|---|---|
| 4,156,774 | 5/1979 | Buxbaum et al. | 528/302 |
| 4,173,658 | 11/1979 | Bax et al. | 528/302 |
| 4,252,940 | 2/1981 | Sublett | 528/302 |

*Primary Examiner*—Maurice J. Welsh
*Attorney, Agent, or Firm*—Sigalos & Levine

[57] ABSTRACT

Copolyester polyol resins comprising the reaction product of an aromatic component, an aliphatic component selected from certain dibasic compounds, at least one primary hydroxyl glycol, and at least one secondary hydroxyl glycol, the mole ratios of the components being:

(i) glycols to aromatic plus aliphatic component of about 1.3 to 2:1,
(ii) aliphatic component to aromatic component of about 0.3 to 1.7:1, and
(iii) primary glycol to secondary glycol of about 0.6 to 2.5:1.

The invention also comprises foamable blends utilizing such resins and resultant polyisocyanurate foams.

20 Claims, No Drawings

COPOLYESTER POLYOL RESINS, FOAMABLE BLENDS COMPRISING THE SAME, AND RESULTANT POLYISOCYANURATE FOAMS

BACKGROUND OF THE INVENTION

The present invention relates to certain polyester polyols suitable for preparing polyisocyanurate foams having excellent dimensional strength and achieving ASTM E 84 Class 1 (25 Flame Spread) flame retardancy without the use of flame retardant additives. The use of Flame Spread rating data is not intended to represent large scale fire hazard resistance properties, but is used only as a reference to historical data.

The use of polyester polyols to prepare urethane foams is an old and well known procedure. Over the years many inventions have been made to improve the resultant products in terms of lower cost, low viscosity to permit ready handling in conventional urethane mixing and pumping systems, better dimensional strength of the foam, increased fire retardancy of the foam, and many other properties. While some success has been encountered in one or more of the desired properties it has not been possible to have polyester polyol resins with the requisite low viscosity and resultant foams having the desired dimensional strength, necessary fire retardancy, and low cost.

Thus, for example, it has been necessary to add fire retardants such as tri($\beta$-chloroisopropyl) phosphate to polyester polyols to obtain the necessary fire retardancy. In some instances such fire retardants also act to make the polyester polyol blend miscible with the CFC-11 (chlorofluorocarbon #11) conventionally used to make the foam or to lower their viscosity sufficiently to make them useful. Efforts to avoid the negative plasticizer effect of fire retardants by use of certain surfactants to lower viscosity and/or provide miscibility with the CFC-11 have not been successful since the resultant foams burn too readily and lack the adequate fire retardancy.

With some low molecular weight polyester polyols which have an adequate low viscosity, it has been found that they oftentimes have a high hydrogen content which produces poor fire retardancy or a hydroxyl number so high as to require a large proportion of isocyanate to form a suitable foam, thereby greatly adding to cost. Because of a low proportion of polyol, the CFC-11 must be blended into the isocyanate into an "A" blend portion as it is conventionally called. This imbalance precludes the use of normal urethane mixing equipment and creates mixing problems.

Further efforts to solve the problems of making suitable polyisocyanurate foams involve the use of a low molecular weight polyether diol or a polyether polyol resin mix with a functionality slightly above 2 as the urethane modifier to reduce the friability of the foam. These approaches have the same limitations as previously explained with respect to the use of low molecular weight polyester polyols.

It has not been possible to use existing polyols in a conventional (normal) "B" blend with a suitable amount of CFC-11 to make a low density foam (2 lbs./cu. ft. or less) without the need to dilute or blend the polyol with a suitable fire retardant to make a Class 1 (25 Flame Spread) foam.

SUMMARY OF THE INVENTION

The present invention overcomes the problems of the prior art and provides a polyol which eliminates the need for a fire retardant to achieve the ability to make a conventional "B" blend with CFC-11 (or other conventional chlorofluorocarbons used to make polyisocyanurate foams) and without any need to add coupling agents to insolubilize the CFC-11 in the resin blend; which "B" blend can be used to make Class 1 (25 Flame Spread) foams. Moreover, the polyol has a viscosity low enough to be commercially suitable and requires no other material blended with it to achieve sufficient chlorofluorocarbon miscibility. Other advantages of the polyol of the present invention are that it has a sufficiently low percent hydrogen content that it can be used in high weight ratios with isocyanates; i.e., about 65 parts by weight polyol per 100 parts by weight isocyanate, and still achieve a Class 1 (25 Flame Spread) flame retardancy; and the polyols will give highly dimensionally stable polyisocyanurate foams with an Index of 4. The term "Index" is used herein to mean its conventional usage of the ratio of active isocyanate groups (—NCO) to the active hydroxyl (—OH) groups.

Briefly, the present invention comprises a hydroxyl terminated copolyester polyol resin having a functionality between about 2 and about 3 comprising the reaction product of:
  (i) an aromatic component selected from phthalic anhydride; phthalic acid isomers; di-lower alkanol esters of phthalic acids; di-, and tri-carbomethoxy substituted diphenyls, benzyl esters, toluenes, benzenes, benzophenones; or mixtures thereof, and
  (ii) at least one aliphatic component selected from dibasic aliphatic acids, esters, anhydrides, or mixtures thereof,
  (iii) at least one primary hydroxyl glycol, and
  (iv) at least one secondary hydroxyl glycol; the mole ratios of the components being:
  (i) glycols to aromatic plus aliphatic component of from about 1.3 to 2:1,
  (ii) aliphatic component to aromatic component of from about 0.3 to 1.6:1, and
  (iii) primary glycol to secondary glycol being from about 0.6 to 2.5:1, where the charged mole ratios are the same as the final mole ratios since no removal of glycols is made during the reaction.

The invention also comprises a foamable copolyester polyol blend comprising:
  (a) A hydroxyl terminated copolyester polyol resin having a functionality between about 2 and about 3 comprising the reaction product of:
    (i) at least one aromatic component selected from phthalic anhydride; phthalic acid isomers; di-lower alkanol esters of phthalic acids; di-, and tri- carbomethoxy substituted diphenyls, benzyl esters, toluenes, benzenes, benzophenones; or mixtures thereof, and
    (ii) at least one aliphatic component selected from dibasic aliphatic acids, esters, anhydrides, or mixtures thereof,
    (iii) at least one primary hydroxyl glycol, and
    (iv) at least one secondary hydroxyl glycol; the mole ratios of the components being:
    (i) glycols to aromatic plus aliphatic component of from about 1.3 to 2:1,
    (ii) aliphatic component to aromatic component of from about 0.3 to 1.6:1, and (iii) primary glycol to secondary glycol being from about 0.6 to 2.5:1; where the charged mole ratios are the same as the final mole ratios since no removal of glycols is made during the reaction.

(b) A catalyst suitable for preparing a polyisocyanurate foam;

(c) A foaming agent suitable for preparing a polyisocyanurate foam; and, optionally, (d) A surfactant suitable for controlling foam cell size and shape.

Further, the invention comprises a polyisocyanurate foam comprising the reaction product of:

(a) A polymethylene polyphenylisocyanate, (b) A hydroxyl terminated copolyester polyol resin having a functionality between about 2 and about 3 comprising the reaction product of:

(i) an aromatic component selected from phthalic anhydride; phthalic acid isomers; di-lower alkanol esters of phthalic acids; di-, and tri- carbomethoxy substituted diphenyls, benzyl esters, toluenes, benzenes, benzophenones, or mixtures thereof, (ii) at least one aliphatic component selected from dibasic aliphatic acids, esters, anhydrides, or mixtures thereof, (iii) at least one primary hydroxyl glycol, and (iv) at least one secondary hydroxyl glycol; the mole ratios of the components being:

(i) glycols to aromatic plus aliphatic component of from about 1.3 to 2:1, (ii) aliphatic component to aromatic component of from about 0.3 to 1.6:1, and (iii) primary glycol to secondary glycol being from about 0.6 to 2.5:1; where the charged mole ratios are the same as the final mole ratios since no removal of glycols is made during the reaction.

(c) A catalyst suitable for preparing a polyisocyanurate foam, (d) A foaming agent suitable for preparing a polyisocyanurate foam, and, optionally, (e) A surfactant suitable for controlling foam cell size and shape.

DETAILED DESCRIPTION

The exclusive use of aromatic ester groups in making a polyester polyol results in a polyol which must be further blended because it is too viscous to use by itself and has poor CFC-11 compatibility. Some aliphatic ester polyester polyols have been made with a low viscosity and excellent CFC-11 miscibility, but have contained a large amount of hydrogen, and have had to either use a fire retardant to achieve a Class 1 (25 Flame Spread) foam or else use a large weight ratio of isocyanate to polyol, and thus require CFC-11 be mixed with the isocyanate in order to introduce enough CFC-11. In attempting to reduce the hydrogen content of a polyol to a level low enough where about 65 parts by weight (Pbw) per 100 parts by weight (Pbw) polymethylene polyphenylisocyanate (PMDI) would produce a Class 1 (25 Flame Spread) foam, it became apparent that the level of CFC-11 miscibility was proportional to the level of hydrogen. Miscibility in chlorofluorocarbons appears to be related to hydrogen content, getting better as the percentage hydrogen goes up, especially when the hydrogen appears as —CH$_3$, such as in secondary polyols and glycols.

It was found, surprisingly, that at a certain low calculated percent hydrogen, neither aliphatic nor aromatic carboxylic group sources alone could provide a polyol with sufficient CFC-11 miscibility, but that within a certain range of aliphatic to aromatic mixture which was reacted together, the same percentage hydrogen content polyol would have sufficient CFC-11 miscibility. It is predictable that the viscosity of a polyol made from an aromatic/aliphatic blend would be higher than the same molecular weight polyol made with the same glycol mixture with pure aliphatic carboxylics, and that it would be lower than with the same molecular weight polyol made with the same glycol mixture with pure aromatic carboxylics. These predictions proved true, but it was not predictable that when making polyols with equal percentage hydrogen content, a copolyester using both aliphatic and aromatic sources of carboxylic groups, mixed and reacted, would have better CFC-11 miscibility than a simple polyester polyol using either aliphatic or aromatic carboxylic groups. Advantageously, the ratio of aliphatic to aromatic mixture where CFC-11 miscibility is good also provides a favorable viscosity with the needed low percentage hydrogen content.

It is an object of the instant invention to maintain an equivalent weight in the range of about 320 to about 350 so that a normal "A" to a "B" blend ratio of about 50:50 would provide a foam with an Index of about 4.0. Since the trimerized isocyanate linkage is a more desirable linkage than urethane linkages in accomplishing fire resistance and dimensional stability, the polyol equivalent weight must stay high enough to provide a 4 to 1 ratio of —NCO groups to —OH groups (4.0 Index) while preparing a "B" blend with about 65 Pbw polyol which will then mix with 100 Pbm of PMDI. It was decided to keep the functionality near 2, since the higher the functionality, the lower the Index of the foam at any given weight ratio.

It is likewise necessary with the present invention to provide a polyol with sufficient primary hydroxyl tips to make a fast enough reaction with isocyanate groups to be commercially useful, and at the same time retain enough secondary hydroxyl units to provide CFC-11 compatibility. Predominant use of secondary hydroxyl tips provides a slow reacting polyol which, in turn, makes unacceptably large and open cell structure foam. While the longer chain polyethylene primary glycols such as PEG 200, and PEG 300 provide both CFC-11 solubility and reaction speed, they contain too much hydrogen to provide a product which obtains a Class 1 foam when used as the only glycols in the present manner. Predominant use of the lower molecular weight primary mono- and di- ethylene glycols keeps the hydrogen content down, but they make polyols with poor CFC-11 compatibility.

An additional advantage of the polyols of the present invention is that due to their high equivalent weight, low hydrogen content, and good CFC-11 miscibility, they can be used in enough mass weight to hold enough CFC-11 in solution that no CFC-11 needs to be added to the PMDI, and no diluents nor coupling agents such as non-ionic surfactants or fire retardants need to be added to the polyols to hold CFC-11 in a quantity sufficient to provide a nominal 2.0 lbs./cu. ft. foam. Even using a high mass of pure, undiluted polyol, the high equivalent weight of the present invention makes it possible to produce a foam with a 4.0 Index. It has been found that when plotting foam Index versus strength, dimensional stability, and fire resistance properties, that all the physical properties of foam improve sharply up to an Index of about 4.0, and then gradually increase, or level out, before dropping again at a high enough Index where excess friability causes poor compressive strength and flexural strength. Thus, the ability to provide a 4.0 Index foam at a normal "A" to "B" blend ratio of about 50:50 Pbw is a significant advantage of the present invention.

A narrow range of certain blends of secondary glycols with low-medium mole weight primary glycols could be used advantageously with a narrow range of certain blends of aromatic esters and aliphatic esters to accomplish all the objects of this invention. It is required to use at least one aromatic component selected from phthalic anhydride; phthalic acid isomers; di-lower alkanol esters of phthalic acids; di- and tri- carbomethoxy substituted diphenyls, benzyl esters, toluenes, benzenes, benzophenones; or mixtures thereof and at least one aliphatic component selected from succinic, glutaric, or adipic acids, esters, anhydrides, or mixtures thereof. Also one must use at least one primary hydroxyl glycol and at least one secondary hydroxyl glycol. Primarily, for reasons of lower cost, it is preferred to use commercially available mixtures of the aromatics, aliphatics, and/or glycols. As aromatics, mixtures of ortho, meta, and para dimethyl phthalates and monomethyl toluate esters (MPME by Hercofina), and mixtures of DMT with mono-, di- and trimethyl (or benzyl) biphenyl esters (DMT/HBR by DuPont and TERATE 101 by Hercules) are available. Also, these products contain amounts of mono-functional ester, which aids in reducing the friability of the finished foam due to plasticizing effect. As to the aliphatics, a mixture of dimethyl esters of succinic, glutaric, and adipic acids is preferred. The primary glycols that can be used are ethylene glycol, diethylene glycol, tetraethylene glycol, polyethylene glycol 200, 1,4 butylene glycol, triethylene glycol, or mixtures thereof, with the ethylene glycol being suitable only when used with other primary glycols. The secondary glycols that can be used include propylene glycol, dipropylene glycol, and 1,3 butylene glycol, or mixtures thereof.

Specific embodiments of the present invention include a specific reaction product comprising ethylene glycol, propylene glycol, diethylene glycol, triethylene glycol, and tetraethylene glycol mixed to react with dimethylterephthalate, di- and tri-methyl biphenyl carboxylate, and the dimethyl esters of the mixed succinate, glutarate and adipate family. A major oligimer of the reaction product can be represented by:

where:
$R_1$ can be —$CH_2$—$CH_2$—(ethylene glycol core), or —$CH_2$—$CH_2$—O—$CH_2$—$CH_2$—(diethylene glycol core), or

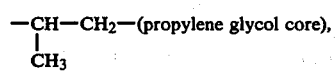

or the oxyethylene core of tri- or tetra- ethylene glycol, and
$R_2$ can be —$CH_2$—$CH_2$—, or —$CH_2$—$CH_2$—$CH_2$—, or —$CH_2$—$CH_2$—$CH_2$—$CH_2$—(Succinate, glutarate, and adipate aliphatic dicarboxylic cores), and $R_3$ can be the same glycol core, or one of the other glycol cores shown in $R_1$, but probably not the same glycol core as
$R_1$, and
$R_4$ can be:

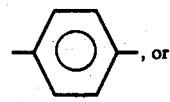 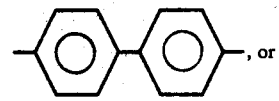

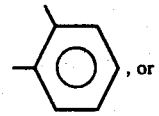 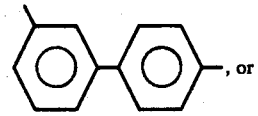

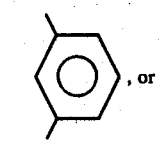 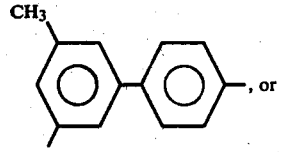

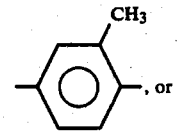 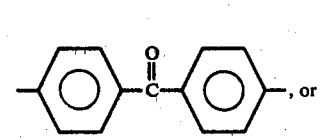

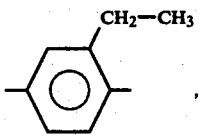

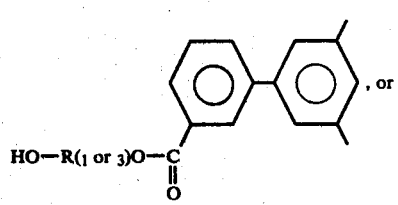

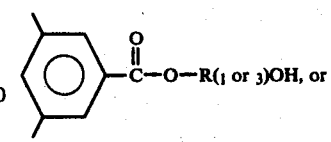

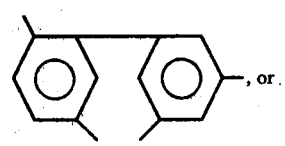

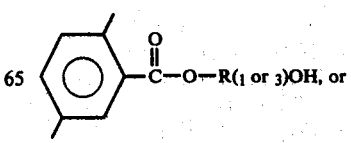

-continued

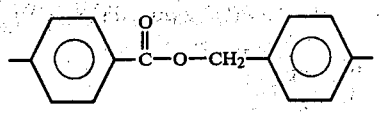

As to proportions, the mole ratios of the various components should be as follows:

(a) glycols to aromatic plus aliphatic component in the range of from about 1.3 to 2:1; preferably 1.4 to 1.5:1;

(b) aliphatic component to aromatic component in the range of from about 0.3 to 1.7:1 and preferably 1.0 to 1.5:1; and (c) primary glycol to secondary glycol in the range of from about 0.6 to 2.5:1; preferably 1.0 to 1.5:1.

With the instant invention the charged mole ratios are the same as the final mole ratios since no removal of glycols is made during the reaction. Also, as a general rule the higher the single benzene ring content, as opposed to bi-ring content, of the aromatic component, the lower the amount of aliphatic component necessary for optimum results.

The transesterification reaction of the mixed esters with the mixed glycols takes place between 130° C. and 250° C., preferably between 160° C. and 220° C., with the use of a suitable catalyst such as tetrabutyltitanate, dibutyl tin oxide, potassium methoxide, lead oxide, or zinc oxide used in the amount of 0.1% to 0.5% of the weight of the whole mixture. The reaction of laboratory amounts takes from 4 to 6 hours with methanol being removed constantly to drive the otherwise equilibrium reaction to completion. At least 95%, and preferably 100%, of the available methyl alcohol is removed by packed column separation distillation, aided in the late stages by mild vacuum application, taking care not to remove glycols.

After the instant copolyester polyol resin is made, a "B" blend is formed by admixing the polyol with a conventional catalyst, blowing agent, and surfactant.

As to the catalysts, one can use any conventionally used in producing polyisocyanurate foams such as a combination of a metallic carboxylate with a tertiary amine or a quaternary amine salt catalyst.

Any alkali metal carboxylate can be employed such as sodium or lithium octoate, lithium stearate, or sodium caprioate; with the preferred metal being potassium used with acetate, adipate, butyrate, decanoate, isobutyrate, nonate, and stearate; with the most preferred form being potassium 2-ethylhexoate, also known as potassium octoate. The preferred version of potassium octoate is one which has at least 14% potassium. One such product is "Potassium HexCem, Code 977," as sold by Mooney Chemical Company. Other suppliers include M&T Chemicals, Inc. and Jim Walter Resource Company.

In conjunction with an alkali metal carboxylate catalyst, some form of an amine catalyst must be used. Common tertiary amine catalysts used in conjunction with alkali metal carboxylate catalysts include N,N-dimethylcyclohexylamine, N,N-dimethylbenzyl amine, tetramethylethylene diamine, tetramethyl propane diamine, triethylene diamine, N,N-dimethylethanolamine, and 2,4,6 tris (dimethylaminomethyl) phenol, which is the preferred tertiary amine. This tertiary amino phenol is sold by Rohm and Haas Co. under the name "DMP-30", and by Thiokol Corporation as "EH330".

Other trimerization catalysts can be used in place of, or in conjunction with, the preferred catalysts shown in the Examples. For example, certain amine salts, preferably quaternary ammonium compounds, such as the N-hydroxypropyl trimethyl ammonium salt of formic acid can be used advantageously as a replacement for all, or part, of the catalysts of the preferred compositions. Such quarternary ammonium salts can be obtained under the trade name "DABCO TMR" or "DABCO TMR-2" from Air Products & Chemicals Company. It has been found that the total weight percent of potassium 2-ethylhexoate plus the tertiary amino phenol can be used as a good starting point for the weight percent addition rate of the quaternary amine salt catalysts. The total catalyst level usually comprises from 0.1 to 4.0, and preferably comprises from 0.7 to 3.0, weight percent of the composition.

With respect to surfactants, any commercial grade of polydimethylsiloxane-polyoxyalkylene block copolymer, such as "L-5420" and "L-5340" from Union Carbide Corporation and "DC-193" from Dow Corning Corporation can be used. The surfactant generally comprises from 0.05 to 4, and preferably comprises from 0.1 to 2, weight percent of the composition.

The blowing agent can be any commonly employed in similar prior art foam products. These include water (for $CO_2$ blowing), methylene chloride, and chlorofluorocarbons such as $C-Cl_2F-C-ClF_2$, $C-Cl_2F-CF_3$, $C-Cl_2F_2$, and fluorotrichloromethane, $C-Cl_3F$, (CFC—11), which is the preferred blowing agent. The blowing agents are employed in an amount sufficient to produce the desired foam density which is generally between 0.5 and 10, and preferably between 1 and 5 pounds per cubic foot. The CFC type blowing agents generally comprise from 1 to 30, and preferably comprise from 5 to 20, weight percent of the composition.

Any commercially available isocyanates can be employed within the broadest aspect of the present invention. The preferred versions are polymethylene polyphenylisocyanates, and are those with a functionality between 2.1 and 3.2, and most preferable are those between 2.5 and 3.2 functionality. The preferred molecular weight PMDI's are those with the above preferred functionalities and with an equivalent weight between 130 and 145. These products tend to produce viscosities in the range of 250 to 2500 cps (at 25° C.), and are practical for commercial use within the scope of this invention. As indicated, the level of PMDI used should provide a ratio of —NCO to —OH of about 4.0 to 1.0.

The invention will be further described in connection with the following examples which are set forth for purposes of illustration only.

In all of the following examples of acceptable foams, the foam produced exhibited excellent dimensional stability, in that the expansion rate at 225° F. dry heat and at 158° F. at 95+% RH was less than 4.5% volume change in 14 days. One or more of the example foams tested produced excellent fire resistance properties in that the Oxygen Index (ASTM D 2863-77) was about 24, the Butler Chimney (ASTM D-3014), and the 48-inch tunnel both indicated a 25 Flame Spread had been achieved.

EXAMPLE I

A reactor which was equipped with a center mixer, a separate chemical inlet, a temperature monitoring probe (thermocouple or thermometer), and a packed column with stillhead was used. The packed column was topped with a stillhead fitted with condensate thermometer. The downleg of the stillhead was connected to an 18 inch water cooled condenser followed by a vertically bent downleg vacuum/collection adapter fitted to a graduated Erlenmyer flask in the vertical position. All glassware had ground glass joints. The 2 liter reaction kettle was jacketed with a form-fitted heating mantle.

The kettle was charged with:

(1) 2.0 moles (540 grams) of the mixed DMT/mono-, di-, and tri-methyl (or benzyl) biphenyl esters; DMT/HBR by DuPont (hereinafter referred to as "Aromatic Esters"), (2) 2.5 moles (400 grams) of the mixed dimethyl esters of succinic, glutaric, and adipic acid series (hereinafter referred to as "Aliphatic Esters"), (3) 2.9 moles of propylene glycol; (220.4 grams) (hereinafter referred to as "PG"), (4) 3.1 moles of diethylene glycol; (328.6 grams) (hereinafter referred to as "DEG"), and (5) 0.5 moles of tetraethylene glycol; (97 grams).

This mixture was melted and brought to a temperature of 180° C. with rapid stirring without catalyst being present. At this temperature, a mixture of methanol and glycol vapors filled the packed column and methanol started to condensate over the stillhead slowly. At this time, 2.0 grams (0.126 weight %) of tetra n-butyl ortho titanate was added through the chemical addition opening to the hot mixture with the agitator stopped. The reaction proceeded rapidly and mixing was resumed, taking care not to allow the stillhead temperature to elevate to 70° C. In order to keep glycols from co-distilling over with methanol it is important to maintain this temperature at 65° C., closer to the boiling point of methanol. The methanol condensate was collected rapidly for almost one hour, but the reaction speed, as measured by condensate production rate, slowed markedly at about 1½ hours. At this point, another 2.0 grams of tetrabutyl titanate was added in the same manner as before. As the reaction proceeded to completion, the reaction kettle temperature increased without adding more power. At 220° C. kettle temperature, the heat input was reduced 30% and a very slight vacuum (minus 2–4 inches of Hg) was added to the system through an ice chilled vacuum trap in line with the vacuum adapter connection at the condenser discharge. The kettle temperature stopped rising. The vacuum was increased as the methanol condensate rate slowed, taking care not to exceed minus ten inches Hg vacuum. As the vacuum was slowly increased, the stillhead temperature slowly dropped from the normal 64°–65° C. at atmospheric pressure to approximately 40° C., and the kettle temperature slowly dropped to 210° C. At 205° C, kettle temperature, the methanol had essentially stopped condensing. About 4½ hours had elapsed since the initiation of kettle heat.

This resin exhibited the following properties:

| | |
|---|---|
| 1. Viscosity: | 11,000 cps at 25° C. |
| 2. Hydroxyl Number | 164 |
| 3. CFC-11 Solubility | 100% CFC-11 retained without separation in a blend of 30 Pbw CFC-11 and 70 Pbw Resin |

The foam for this example was made with the formula

| Component | Pbw |
|---|---|
| "A" Blend or PMDI | 100.0 |
| Polyol, Polyester Resin | 66.0 |
| Surfactant DC-193 | 2.0 |
| Catalyst, Potassium HexCem, Code 977 | 2.6 |
| Catalyst, DMP 30 | 1.7 |
| Blowing Agent, CFC-11 | 26.7 |
| "B" Blend Total | 99.0 |

Some properties of this foam and the reaction rates include:

| | |
|---|---|
| Cream Time: | 6 seconds |
| Gel Time: | 25 seconds |
| Firm Time: | 28 seconds |
| Full Rise Time: | 56 seconds |
| Density: | 1.7 lbs./cu. ft (Free Rise) |
| Friability: | Acceptable |
| Foam Appearance: | Good, fine cell structure |

EXAMPLE II

In another example, the same equipment was used to prepare the following resin:

| | |
|---|---|
| (1) | 2.0 moles (540.0 grams) of Aromatic Esters, |
| (2) | 2.5 moles (400.0 grams) of Aliphatic Esters, |
| (3) | 2.6 moles (197.6 grams) of PG, |
| (4) | 2.9 moles (307.4 grams) of DEG, |
| (5) | 0.8 moles (Approx. 160 grams) of polyethylene glycol 200 (PEG 200). |

This mixture was melted and mixed rapidly following the same procedure outlined in Example I. As was the case in Example I, the catalyst used was tetrabutyltitanate and it was added in 2 stages, 2.0 grams at each time. Similarly, when the kettle temperature reached 220° C. the vacuum was added slowly, increasing vacuum as the kettle and head temperatures decreased. This reaction covered 4.3 hours.

| POLYOL PROPERTIES: | |
|---|---|
| Viscosity: | 14,000 cps at 25° C. |
| Hydroxyl Number: | 155 |
| CFC-11 Solubility: | 100% retained without separation in a blend of 30 Pbw CFC-11 and 70 Pbw Resin. |

| FOAM FORMULATION: COMPONENT | Pbw |
|---|---|
| Polyol Resin | 65.0 |
| Surfactant DC 193 | 2.5 |
| Potassium HexCem | 1.9 |
| DMP-30 | 1.0 |
| CFC-11 | 28.6 |
| "B" Blend Total: | 99.0 |
| PMDI ("A" Blend): | 104.0 |

| FOAM PROPERTIES: | |
|---|---|
| Cream Time: | 8 seconds |
| Gel (2nd Rise): | 43 seconds |
| Firm Time: | 48 seconds |
| Full Rise: | 80 seconds |
| Density: | 1.63 lbs./cu. ft. |
| Friability: | Acceptable |
| Foam Appearance: | Good, fine cell size. |

EXAMPLE III

The same equipment was used to transesterify:

| | | |
|---|---|---|
| (1) | 2.0 moles (540.0 grams) of Aromatic Esters, | |
| (2) | 2.3 moles (368.0 grams) of Aliphatic Esters, | |
| (3) | 4.5 moles (342.0 grams) of PG, | |
| (4) | 1.5 moles (159.0 grams) of DEG, | |
| (5) | 0.4 moles (Approx. 80.0 grams) of PEG 200. | |

In this example the catalyst used was a laboratory prepared potassium methoxide, $KOCH_3$. A total of 7.0 grams, 2 additions of 3.5 grams, was used. The same procedure as outlined in Example I was followed. This catalyst appeared to be less active as the elapsed time of this preparation was 5.5 hours.

| POLYOL PROPERTIES: | |
|---|---|
| Viscosity: | 5100 cps at 27° C. |
| Hydroxyl Number: | 182 |
| CFC-11 Solubility: | 100% of the 30 Pbw CFC-11 added to 70 Pbw Resin |

| FOAM FORMULATION COMPONENT | Pbw |
|---|---|
| Polyol Resin | 68.0 |
| Surfactant DC 193 | 2.1 |
| Potassium HexCem | 3.1 |
| DMP-30 | 2.0 |
| CFC-11 | 24.8 |
| "B" Blend Total: | 100.0 |
| PMDI ("A" Blend): | 102.0 |

| FOAM PROPERTIES: | |
|---|---|
| Cream Time: | 18 seconds |
| Gel (2nd Rise): | 55 seconds |
| Firm Time: | 75 seconds |
| Full Rise: | 105 seconds |
| Density: | 1.85 lbs./cu. ft. |
| Friability: | Unacceptable |
| Foam Appearance: | Large, coarse cell structure; not acceptable. |

EXAMPLE IV

The same equipment was used to transesterify:

| | | |
|---|---|---|
| (1) | 2.0 moles (540.0 grams) of Aromatic Esters, | |
| (2) | 3.0 moles (480.0 grams) of Aliphatic Esters, | |
| (3) | 3.8 moles (402.8 grams) of DEG, | |
| (4) | 3.1 moles (235.6 grams) of PG. | |

The catalyst was tetrabutyltitanate used as in Example I, 1.8 grams added twice. The total elapsed time to completion was 4.7 hours.

| POLYOL PROPERTIES: | |
|---|---|
| Viscosity: | 14,100 cps at 24° C. |
| Hydroxyl Number: | 151 |
| Solubility: | Only 86.8% of the CFC-11 of a 30 Pbw CFC-11 with a 70 Pbw resin mixture was retained; not acceptable. |

| FOAM FORMULATION: COMPONENT | Pbw |
|---|---|
| Polyol Resin | 70.0 |
| DC 193 | 2.1 |
| Potassium HexCem | 2.0 |
| DMP-30 | 1.5 |
| CFC-11 | 24.4 |
| "B" Blend Total: | 100.0 |
| PMDI | 104.1 |

| FOAM PROPERTIES: | |
|---|---|
| Cream Time: | 8 seconds |
| Gel (2nd Rise): | 35 seconds |
| Firm Time: | 40 seconds |
| Full Rise: | 55 seconds |
| Density: | 1.80 lbs./cu. ft. |
| Friability: | Acceptable |
| Appearance: | Excellent, fine cells |

EXAMPLE V

| | | |
|---|---|---|
| (1) | 2.0 moles (540.0 grams) of Aromatic Esters, | |
| (2) | 2.5 moles (400.0 grams) of Aliphatic Esters, | |
| (3) | 5.6 moles (425.6 grams) of PG, | |
| (4) | 1.3 moles (137.8 grams) of DEG. | |

In this example, the catalyst used was dibutyltinoxide at a total rate of 3.4 grams for the preparation, with 1.7 grams being added twice as in the procedure of Example I. The reaction elapsed time was 5.0 hours.

| POLYOL PROPERTIES | |
|---|---|
| Viscosity: | 5555 cps at 25.0° C. |
| Hydroxyl Number: | 201 |
| Solubility: | Retained 100% of a 37 Pbw CFC-11 mix with 63 Pbw Resin. |

| FOAM FORMULATION: COMPONENT | Pbw |
|---|---|
| Polyol Resin | 68.0 |
| DC 193 | 2.1 |
| Potassium HexCem | 2.5 |
| DMP-30 | 1.5 |
| CFC-11 | 25.9 |
| "B" Blend Total | 100.0 |
| PMDI | 105.0 |

| FOAM PROPERTIES: | |
|---|---|
| Cream Time: | 7 seconds |
| Gel (2nd Rise): | 30 seconds |
| Firm Rise: | 35 seconds |
| Full Rise: | 45 seconds |
| Density: | 1.70 lbs./cu. ft. |
| Friability: | Acceptable |
| Appearance: | Good; fine cell structure. |

EXAMPLE VI

The same equipment was used to transesterify:

| | | |
|---|---|---|
| (1) | 2.0 moles (540.0 grams) of Aromatic Esters, | |
| (2) | 3.0 moles (480.0 grams) of Aliphatic Esters, | |
| (3) | 3.4 moles (258.4 grams) of PG, | |
| (4) | 3.3 moles (349.8 grams) of DEG, | |
| (5) | 0.4 moles (80.0 grams) of PEG 200. | |

The catalyst was tetrabutyltitanate used as in Example I. The reaction elapsed time was 4.9 hours.

| POLYOL PROPERTIES: | |
|---|---|
| Viscosity: | 9100 cps at 25.0° C. |
| Hydroxyl Number: | 159 |
| Solubility: | 100% CFC-11 retained of 30 Pbw CFC-11 mixed with 70 Pbw Resin. |

FOAM FORMULATION:

-continued

| COMPONENT | Pbw |
|---|---|
| Polyol Resin: | 64.0 |
| DC 193: | 2.1 |
| Potassium HexCem: | 2.6 |
| DMP-30: | 1.6 |
| CFC-11: | 28.7 |
| "B" Blend Total: | 99.0 |
| PMDI | 104.0 |
| FOAM PROPERTIES: | |
| Cream time: | 10 seconds |
| Gel (2nd Rise): | 30 seconds |
| Firm Time: | 35 seconds |
| Full Rise: | 58 seconds |
| Density: | 1.7 lbs./cu. ft. |
| Friability: | Acceptable |
| Appearance: | Excellent fine cell structure. |

EXAMPLE VII

The same equipment was used to transesterify:

| (1) | 2.5 moles (485.0 grams) of Dimethyl Terephthalate, |
|---|---|
| (2) | 2.5 moles (400.0 grams) of Aliphatic Esters, |
| (3) | 3.4 moles (258.4 grams) of PG, |
| (4) | 3.6 moles (381.6 grams) of DEG, |
| (5) | 0.3 moles (62.2 grams) of PEG 200. |

In this example, the normally used mixture of DMT/mono-, di-, and tri-methyl (or benzyl) biphenyl esters was replaced by specification grade DMT. The catalyst used was tetrabutyltitanate as in Example I. The elapsed time was 4.0 hours.

| POLYOL PROPERTIES: | |
|---|---|
| Viscosity: | 4175 cps at 25° C. |
| Hydroxyl Number: | 217 |
| Solubility: | 100% CFC-11 retained of 33 Pbw CFC-11 in 67 Pbw Resin |

| FOAM FORMULATION: | |
|---|---|
| COMPONENT | Pbw |
| Polyol Resin | 66.0 |
| DC 193 | 1.0 |
| Potassium HexCem | 3.0 |
| DMP-30 | 2.0 |
| CFC-11 | 28.0 |
| "B" Blend Total: | 100.0 |
| PMDI | 104.0 |
| FOAM PROPERTIES: | |
| Cream Time: | 8 seconds |
| Gel (2nd Rise): | None |
| Firm Time: | 21 seconds |
| Full Rise: | 34 seconds |
| Density: | 1.66 lbs./cu. ft. |
| Friability: | Acceptable |
| Appearance: | Excellent, fine cell structure |

The present invention also contemplates a flexible foam and urethane-type elastomer in which the isocyanate used is primarily a difunctional isocyanate. The complete details of such are not presently understood, but it is presently theorized that they will utilize the instant copolyester polyols in possibly different ratios of components. The instant copolyester polyols also have the capability of performing as adhesives, again necessitating, possibly, different ratios of components.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A hydroxyl terminated copolyester polyol resin having a functionality between about 2 and about 3 comprising the reaction product of:
   (i) an aromatic component selected from phthalic anhydride; phthalic acid isomers; di-lower alkanol esters of phthalic acids; di-, and tri-carbomethoxy substituted diphenyls, benzyl esters, toluenes, benzenes, or benzophenones; or mixtures thereof, and
   (ii) at least one aliphatic component selected from succinic, glutaric, or adipic acids, esters, anhydrides, or mixtures thereof,
   (iii) at least one primary hydroxyl glycol, and
   (iv) at least one secondary hydroxyl glycol; the mole ratios of the components being:
      (i) glycols to aromatic plus aliphatic component of from about 1.3 to 2:1,
      (ii) aliphatic component to aromatic component of from about 0.3 to 1.7:1, and
      (iii) primary glycol to secondary glycol being from about 0.6 to 2.5:1, where the charged mole ratios are the same as the final mole ratios since no removal of glycols is made during the reaction.

2. The copolyester polyol resin of claim 1 wherein the aromatic component is a mixture of dimethylterephthalate, monomethyl terephthalate, terephthalic acid, heavy metal salts of aromatic carboxylic acids, mono-, di-, and tri-carbomethoxy substituted diphenyls, toluenes, benzenes, benzophenones, and benzyl esters and acids.

3. The copolyester polyol resin of claim 1 wherein the aromatic component is a mixture of dimethyl orthophthalate, dimethyl isophthalate, dimethyl terephthalate, 4-carboxymethyl benzaldehyde, and related single benzene ring mono- and difunctional acids and esters.

4. The copolyester polyol resin of claim 1 wherein the aromatic component is a phthalic isomer selected from phthalic anhydride; a di-lower alkanol ester or acid of isophthalic acid; a di-lower alkanol ester or acid of terephthalic acid; or mixtures thereof.

5. The copolyester polyol resin of claim 1 wherein the aliphatic component is a blend of di-lower alkanol esters of succinic, glutaric, and adipic acid.

6. The copolyester polyol resin of claim 1 wherein the glycol component is comprised of propylene glycol and a glycol selected from ethylene glycol, diethylene glycol, triethylene glycol, tetraethylene glycol, and polyethylene glycol 200, or mixtures thereof.

7. The copolyester polyol resin of claims 1, 2, 3, 4, 5, or 6 wherein the finished mole ratios of the components are:
   (i) glycols to aromatic plus aliphatic components of about 1.4 to 1.5:1,
   (ii) aliphatic component to aromatic component of about 1.0 to 1.5:1, and
   (iii) primary glycol to secondary glycol of about 1.0 to 1.5:1.

8. The copolyester polyol resin of claims 1, 2, 3, 4, 5, or 6 wherein the hydroxyl number of the polyol is between about 150 and 200.

9. The copolyester polyol resin of claims 1, 2, 3, 4, 5, or 6 wherein the Brookfield viscosity is below 10,000 centipoise at 25° C.

10. A foamable copolyester polyol blend comprising:

(a) A hydroxyl terminated copolyester polyol resin having a functionality between about 2 and about 3 comprising the reaction product of:
 (i) at least one aromatic component selected from phthalic anhydride; phthalic acid isomers; di-lower alkanol esters of phthalic acids; mono-, di-, and tri-carbomethoxy substituted diphenyls, benzyl esters, toluenes, benzenes, benzophenones; or mixtures thereof, and
 (ii) at least one aliphatic component selected from succinic, glutaric, or adipic acids, esters, anhydrides, or mixtures thereof,
 (iii) at least one primary hydroxyl glycol, and
 (iv) at least one secondary hydroxyl glycol; the mole ratios of the components being:
  (i) glycols to aromatic plus aliphatic component of from about 1.3 to 2:1,
  (ii) aliphatic component to aromatic component of from about 0.3 to 1.7:1, and
  (iii) primary glycol to secondary glycol being from about 0.6 to 2.5:1, where the charged mole ratios are the same as the final mole ratios since no removal of glycols is made during the reaction.
(b) A catalyst suitable for preparing a polyisocyanurate foam;
(c) A foaming agent suitable for preparing a polyisocyanurate foam; and, optionally,
(d) A surfactant suitable for controlling foam cell size and shape.

11. The foamable copolyester polyol blend of claim 10 wherein the hydroxyl terminated copolyester polyol resin comprises:
 (i) the aromatic component of claims 2, 3, or 4,
 (ii) the aliphatic component of claim 5,
 (iii) the glycols of claim 6,
 (iv) the respective mole ratios of claim 7,
 (v) the hydroxyl number of claim 8, and
 (vi) the viscosity of claim 9.

12. The foamable copolyester polyol blend of claim 10 wherein said foaming agent is fluorotrichloromethane and said foaming agent comprises from about 1 to 30 weight percent of the blend.

13. The foamable copolyester polyol blend of claim 10 wherein the catalyst is potassium octoate in combination with 2,4,6, tris (dimethyl aminomethyl) phenol, or a quaternary ammonium salt.

14. The foamable copolyester polyol blend of claim 10 wherein the surfactant is a polydimethylsiloxane-polyoxyalkylene block copolymer.

15. A polyisocyanurate foam comprising the reaction product of:

(a) A polymethylene polyphenylisocyanate,
(b) A hydroxyl terminated copolyester polyol resin having a functionality between about 2 and about 3 comprising the reaction product of:
 (i) an aromatic component selected from phthalic anhydride; phthalic acid isomers; di-lower alkanol esters of phthalic acids; mono-, di-, and tri-carbomethoxy substituted diphenyls, benzyl esters, toluenes, benzenes, benzophenones, or mixtures thereof,
 (ii) at least one aliphatic component selected from succinic, glutaric, or adipic acids, esters, anhydrides, or mixtures thereof,
 (iii) at least one primary hydroxyl glycol, and
 (iv) at least one secondary hydroxyl glycol; the mole ratios of the components being:
  (i) glycols to aromatic plus aliphatic component of from about 1.3 to 2:1,
  (ii) aliphatic component to aromatic component of from about 0.3 to 1.7:1, and
  (iii) primary glycol to secondary glycol being from about 0.6 to 2.5:1; where the charged mole ratios are the same as the final mole ratios since no removal of glycols is made during the reaction.
(c) A catalyst suitable for preparing a polyisocyanurate foam,
(d) A foaming agent suitable for preparing a polyisocyanurate foam, and, optionally,
(e) A surfactant suitable for controlling foam cell size and shape.

16. The polyisocyanurate foam of claim 15 wherein said polyphenylisocyanate has a functionality between about 2.1 and 3.2, and an equivalent weight between 130 and 145.

17. The polyisocyanurate foam of claim 15 wherein the hydroxyl terminated copolyester polyol resin used is the resin of claims 2, 3, 4, 5, or 6.

18. The polyisocyanurate foam of claim 15 wherein the catalyst is potassium octoate in combination with 2,4,6 tris (dimethyl aminomethyl) phenol or a quarternary ammonium salt and the surfactant is a polydimethylsiloxane-polyoxyalkylene block copolymer.

19. The polyisocyanurate foam of claims 15, 16, 17, or 18 wherein the ratio of active isocyanate groups (—NCO) to active hydroxyl (—OH) groups is between about 3.0 to about 4.5:1.

20. The polyisocyanurate foam of claims 15, 16, 17, or 18 wherein the ratio of active isocyanate groups (—NCO) to active hydroxyl (—OH) groups is between about 3.5 to 4.2:1.

* * * * *